Sept. 30, 1958      W. J. WOOD      2,853,791
UNIFORM INSIGNIA GAUGE
Filed May 24, 1957
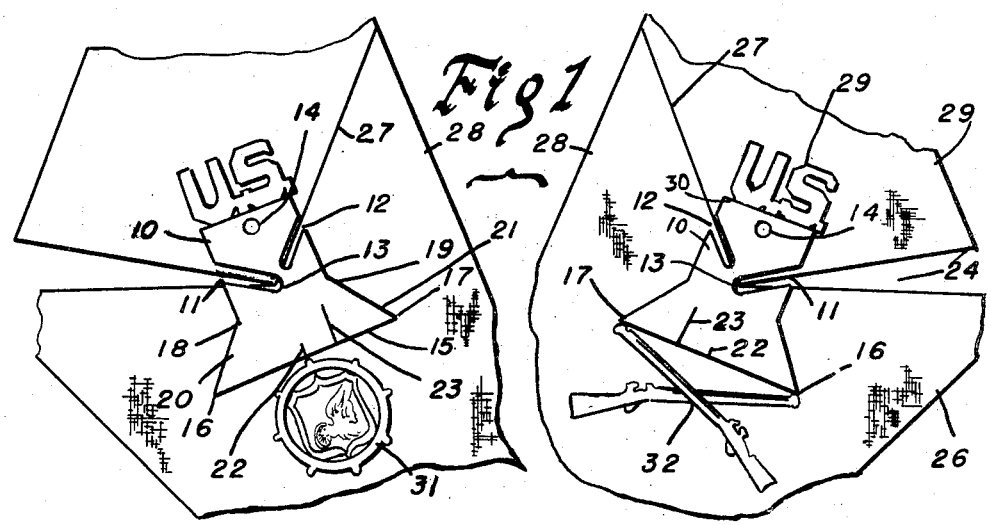
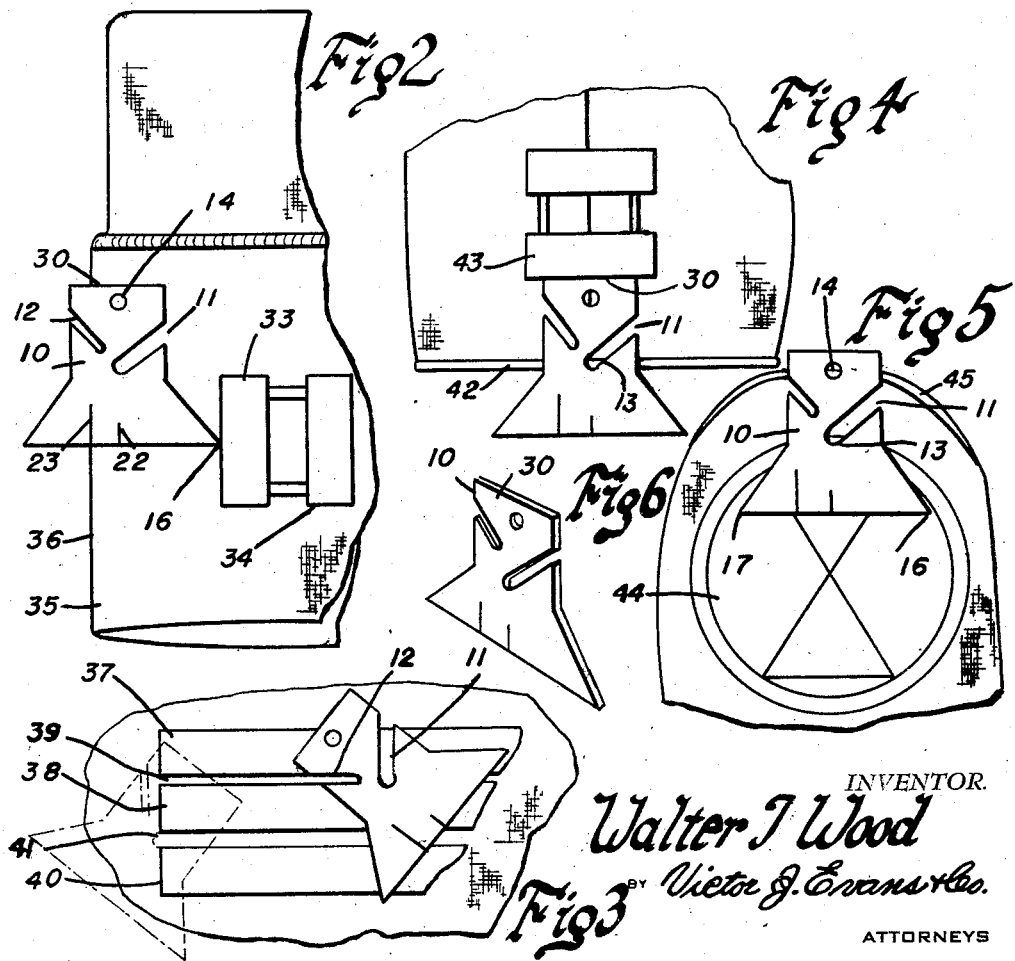
INVENTOR.
Walter J Wood
BY Victor J. Evans & Co.
ATTORNEYS

United States Patent Office 2,853,791
Patented Sept. 30, 1958

2,853,791

UNIFORM INSIGNIA GAUGE

Walter J. Wood, Warwick, Va.

Application May 24, 1957, Serial No. 661,322

6 Claims. (Cl. 33—180)

This invention relates to insignia for uniforms of servicemen, and in particular a gauge for positioning insignia on garments and for laying out the distance of the insignia from edges or other parts of coats, shirts, caps and the like whereby insignia, such as the letters US, Guns, Medals, Loops and the like may be in the same position on all uniforms so that the location and position of insignia of uniforms of all personnel of an outfit is uniform.

The purpose of this invention is to provide a simple gauge for universal use in applying insignia, such as the letters US, guns, medals, shoulder patches, shoulder loops and the like so that the insignia will be positioned on garrison caps, coats, shirts and the like whereby the insignia will have the same appearance on all uniforms and the like.

It is sometimes difficult to determine just how far the letters US should be placed from a seam or edge of a lapel, particularly of a coat or edge of a shirt collar and it is also difficult to determine the angle the letters, guns, loops, and other insignia should be positioned in relation to the edge of a garment. Furthermore, even though the correct dimensions are obtained, mistakes are made in measuring and in some instances it is difficult to hold the parts in position as they are attached to the garment.

With this thought in mind this invention contemplates a gauge having a vertically disposed neck with angularly disposed slots extended inwardly from opposite sides, with one of said slots extended in to a point on the center of the neck and in which the neck extends from diverging surfaces forming shoulders connected by a base whereby the device is formed to be used in different positions for locating different insignia particularly in relation to edges of garments or parts thereof.

The object of this invention is, therefore, to provide a relatively simple gauge for attaching insignia to garments of servicemen in which the necessity of adding and subtracting dimensions or other numerals is obviated.

Another object of the invention is to provide a gauge for locating insignia on uniforms of servicemen in which the same gauge is used for substantially all types of insignia.

A further object of the invention is to provide a gauge for locating insignia of uniforms of servicemen and the like in which the gauge is of a simple and economical construction.

With these and other objects and advantages in view the invention embodies a plate having a vertically disposed neck having angularly disposed slots extended inwardly from opposite sides, and an opening spaced from the upper end and positioned on a center line extended through the neck, the inner end of one of said slots also being positioned on the center line, and a base, the length of which is greater than the width of the neck whereby ends of the base are connected to the lower part of the neck with converging edges.

Other features and advantages of the invention will appear from the following description taken in connection with the drawing, wherein:

Figure 1 is a view showing both sides of the neck of a uniform with gauges positioned to locate the letters US on the upper lapel and an emblem or disc on the lower lapel on one side of the garment and guns on the lower lapel of the other side of the garment.

Figure 2 is a view illustrating the gauge as used for locating rank or unit insignia on garrison caps.

Figure 3 is a view illustrating the use of the gauge for spacing ribbons on a garment.

Figure 4 is a view illustrating the gauge as used for locating rank or unit insignia on shoulder straps of a garment.

Figure 5 is a view showing the use of the gauge for locating a shoulder patch on a garment.

Figure 6 is a view showing the gauge independent of a garment.

Referring now to the drawing wherein like reference characters denote corresponding parts the improved gauge of this invention includes a neck 10 having diagonally disposed slots 11 and 12 extended inwardly from opposite sides thereof, the slot 11 extending inward to a point 13 on a line extended longitudinally through the neck and positioned midway between the sides thereof, the neck also being provided with an opening 14, also positioned on the line extended longitudinally through the neck and positioned midway between the sides thereof and the neck being provided with a base 15 the ends 16 and 17 of which are connected to the lower end of the neck, as shown at the points 18 and 19 with inclined edges 20 and 21, respectively.

The base of the gauge is also provided with indicating means such as a mark or slit 22 positioned on the center of the base and neck and a mark or slit 23 located a predetermined distance, such as one inch, from a point, such as the point 16 at one end of the base, as shown in Fig. 1.

The lines 22 and 23 and also the opening 14 may be in the form of open slots extended inwardly from the edges of the plate.

The gauge is formed of a relatively flat plate and the plate may be made of metal, plastic, or other suitable material.

With the gauge as illustrated and described the inner end 13 of the slot 11 is positioned at the inner end of a space 24 between an upper lapel 25 and a lower lapel 26 with the slot 11 positioned to correspond with the space 24 and with the slot 12 aligned with a seam 27 extended upwardly from the inner end of the space 24. The center line 5, which extends through the mark or notch 22, inner end 13 of the slot 11 and opening 14 is parallel to the edge 28 of the collar of the garment and with the gauge in this position the letters US, as indicated by the numeral 29 are located on the upper end surface 30 of the neck of the gauge in which position they are secured to the garment. A disc or emblem 31 is positioned below the base 15 and on the center line of the gauge and guns 32 are positioned with ends of the muzzles at the points 16 and 17 of the base, the insignia 31 being located on the right hand lapel and the guns on the left hand lapel.

In Fig. 2 the gauge is illustrated as being used to locate rank and unit insignia 33 and 34 of a cap 35, the gauge being positioned with the mark 23 on the edge 36 of the cap and with the point 16 representing the distance of the edge of the loop 34 from the edge 36 of the cap.

As illustrated in Fig. 3 the gauge is also adapted to be used to regulate the distance between ribbons 37, the width of the slot 12 representing the distance between some of the ribbons and the width of the slot 11 representing the distance between ribbons of another garment or ribbons of the same garment, as may be desired. In the design shown ribbons 37 and 38 are spaced by a slot 39 the width of which is equal to the slot 12 and the ribbons 38 and 40 are separated by a slot 41, the width of which is equal to that of the slot 11.

In the design illustrated in Fig. 4 the gauge is shown as used for locating rank or shoulder straps of a garment. In this use the inner end 13 of the slot 11 is positioned on a head 42 at the top of a shoulder and with the end surface 30 extended inwardly representing the distance of the loop 43 from the edge of the material of the shoulder of a garment.

In the design illustrated in Fig. 5 the opening 14 in the upper end of the neck of the gauge is positioned on the hem or head of the shoulder with the base extended downwardly whereby the base represents the distance of a shoulder patch 44 from the bead 45 at the upper edge of the garment, the upper edge of the patch 44 being located by the inner end 13 of the slot 11, and the points 16 and 17 being positioned just inside of the border of the patch.

These uses of the gauge may be considered as typical, as the gauge is adapted to be used in different positions and for locating substantially all insignia on uniforms and parts thereof.

It will be understood that modifications, within the scope of the appended claims, may be made in the design and arrangement of the parts without departing from the spirit of the invention.

What is claimed is:

1. A gauge comprising a flat piece of material having a vertically disposed neck with parallel sides extended from a base with slots in the neck and extended inwardly from opposite sides thereof and with the inner end of one of the slots being positioned on a line extended through the neck, and positioned midway between the sides thereof.

2. A gauge comprising a flat piece of material having a vertically disposed neck with parallel sides extended from a base with slots in the neck and extended inwardly from opposite sides thereof and with the inner end of one of the slots being positioned on a line extended through the neck and positioned midway between the sides thereof, the slots being positioned to form a right angle.

3. A gauge comprising a flat piece of material having a vertically disposed neck with parallel sides extended from a base with slots in the neck and extended inwardly from opposite sides thereof and with the inner end of one of the slots being positioned on a line extended through the neck and positioned midway between the sides thereof, the slots being positioned to form a right angle, and the length of the base being greater than the width of the neck with outwardly inclined edges extended from the neck to extended ends of the base.

4. In a gauge for locating insignia of servicemen's uniforms, the combination which comprises a piece of material having a neck with parallel edges and having diverging edges at the sides extended from the neck to a base, the base being positioned perpendicular to the neck and the neck having diagonally positioned slots extended inwardly from opposite sides with the inner end of one of said slots positioned on a line midway between the sides of the neck.

5. In a gauge for locating insignia of service uniforms, the combination which comprises a piece of material having a neck with parallel edges and having diverging edges extended from the neck to a base, the base being positioned perpendicular to the neck and the neck having diagonally positioned slots extended inwardly from opposite sides with the inner end of one of said slots positioned on the center line of the neck, the extended end of the neck having an opening extended therethrough with the opening positioned on a line positioned midway between the side edges thereof and the base having indicating means thereon also positioned on the line positioned midway between the sides edges of the neck of the gauge.

6. In a gauge for locating insignia of service uniforms, the combination which comprises a piece of material having a neck with parallel edges and having diverging edges extended from the neck to a base, the base being positioned perpendicular to the neck and the neck having diagonally positioned slots extended inwardly from opposite sides with the inner end of one of said slots positioned on a line extended longitudinally through the neck and positioned midway between the parallel edges of the neck, the extended end of the neck having an opening extended therethrough with the opening positioned on the line positioned midway between the edges of the neck and the base having indicating means thereon also positioned on the line positioned midway of the neck of the gauge, the base also having indicating means spaced from the indicating means positioned on the line positioned midway of the edges thereof and said indicating means being located a predetermined distance from one end of the base, the said predetermined distance being equal to the distance of a loop of a cap from an edge of the cap.

References Cited in the file of this patent

UNITED STATES PATENTS

| | | |
|---|---|---|
| 2,207,113 | Barrickman | July 9, 1940 |
| 2,387,986 | Evans | Oct. 30, 1945 |
| 2,637,909 | Thacker | May 12, 1953 |
| 2,681,511 | Seton | June 22, 1954 |
| 2,741,851 | Berardinelli | Apr. 17, 1956 |